H. G. McMURRAY.
CEMENTING MACHINE.
APPLICATION FILED JAN. 23, 1915. RENEWED JULY 1, 1918.
1,293,147.  Patented Feb. 4, 1919.
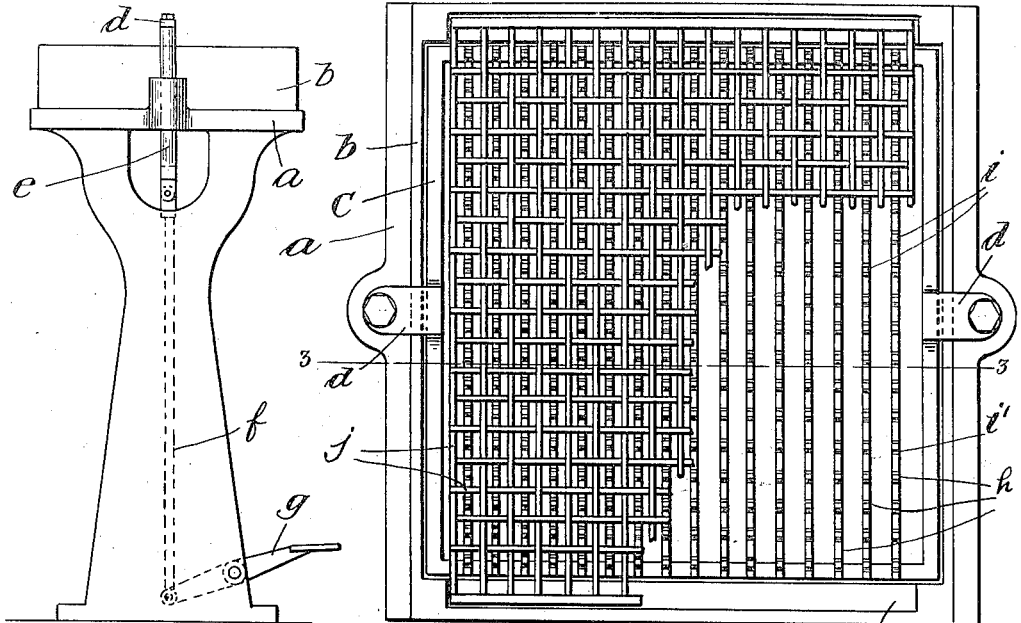
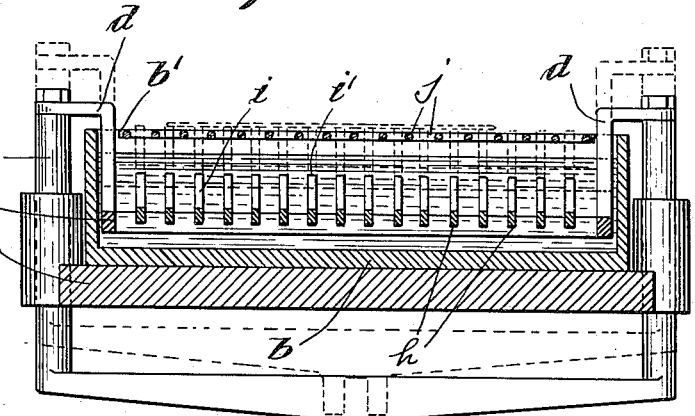
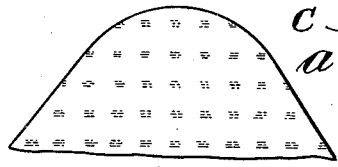
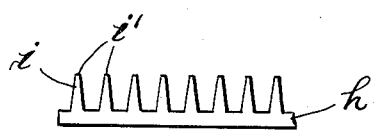
Witnesses:
H. B. Davis
C. L. Erickson
Inventor:
Harry G. McMurray
by Troyer & Hammann
Attys

UNITED STATES PATENT OFFICE.

HARRY G. McMURRAY, OF LEWISTON, MAINE, ASSIGNOR TO IRVING L. KEITH, OF HAVERHILL, MASSACHUSETTS.

CEMENTING-MACHINE.

1,293,147. Specification of Letters Patent. Patented Feb. 4, 1919.

Application filed January 23, 1915, Serial No. 4,045. Renewed July 1, 1918. Serial No. 242,892.

*To all whom it may concern:*

Be it known that I, HARRY G. McMURRAY, a citizen of the United States, residing at Lewiston, in the county of Androscoggin and State of Maine, have invented an Improvement in Cementing-Machines, of which the following is a specification.

This invention relates to cementing machines which are especially designed for use in cementing cloth, known in the shoe trade as "doublers", to the inner side of leather shoe uppers, more generally to vamps, for well-known purposes.

Prior to my invention, it has been customary to attach these cloth doublers to leather vamps, etc., by coating one, or the other, or both of the contacting surfaces with cement. Certain kinds of adhesives, such as various forms of starch paste, which are somewhat stiff and brittle when dry, may be employed for this purpose, such adhesives being less expensive than other kinds, such as rubber cement, which is more flexible.

When a form of cement, which is somewhat stiff when dry, is employed and is spread with a greater or less degree of uniformity over the entire surface of the upper, or doubler, as is customary, and when the parts are united, and become dry, it is found that the flexibility of the piece is greatly decreased. That is, the resulting piece will be stiff and will not conform readily to the last and the cement is liable to crack when bent. The increased stiffness of the upper, thus caused, is a serious objection to the use of these forms of cement, notwithstanding the saving which is made over rubber cement. The use of rubber cement, in this relation, is, however, objectionable for various other reasons, one of which is that it forms an impervious layer in the shoe upper which prevents the escape of moisture from the foot.

The object of my invention is to provide an apparatus for cementing "doublers" which will enable the use of the less expensive forms of adhesives, above referred to, and, at the same time, will obviate the difficulty of causing the piece to be stiffened by the cement, so that the flexibility of the attached pieces will be in no way impaired, and which will prevent the application of an unnecessary quantity of cement, so that a substantial saving in the amount of cement used may be made, and so that no impervious layer of cement, between the vamp and doubler, will be formed.

I accomplish these objects, primarily, by providing an apparatus which will apply the cement to the surface to be cemented, in small dots, or patches, uniformly distributed throughout the entire surface, so that the parts will be attached at these points only, and the intermediate portions of the upper and canvas will be left uncoated, and therefore unattached, and the flexibility of the connected pieces will be substantially unimpaired.

For an understanding of the particular form of apparatus which I preferably employ in accomplishing these objects, reference is made to the accompanying drawing, in which;—

Figure 1 is an end elevation of a cementing apparatus embodying my invention.

Fig. 2 is a plan view thereof on an enlarged scale.

Fig. 3 is a cross sectional view on the line 3—3 of Fig. 2.

Fig. 4 is a detail view of a portion of one set of cementing fingers, and,

Fig. 5 is a view of a portion of a doubler after it has been cemented.

In the drawing, $a$ indicates a suitable bench or supporting table on which the apparatus is mounted, and $b$ a tank, which is made in the form of a flat pan, of rectangular form, which rests upon the table, and is adapted to contain liquid cement to a suitable depth.

According to my invention, I provide a frame $c$ which is adapted to fit loosely in the interior of the pan and to be moved vertically therein while in a horizontal position, angular bracket arms $d$ being secured to the opposite sides of said frame in the middle thereof, and extending upwardly and over the sides of the pan where they are removably connected to a pair of rods $e$, which are mounted to reciprocate vertically in the table, and are connected, beneath the same, to a treadle rod $f$, which is adapted to be lifted by a treadle $g$, so that, when the treadle is depressed, said frame $c$ will be lifted, and will, when pressure on the treadle is removed, sink, by gravity, into the pan, where it may rest on the bottom thereof.

Mounted in the frame $c$ are a series of bars h, arranged in parallelism, each bar being provided with a row of vertically extending fingers i, preferably integrally formed therewith, and each finger being separated from the other by a space of suitable length, which may, in practice, be about one-fourth of an inch, the width of the space between each bar being the same as the distance between the fingers on any bar. The upper ends of said fingers are made flat to provide faces i', to which the sides of the fingers slightly taper, said faces being all arranged, as nearly as practicable, in the same horizontal plane. A perforated work-support, in the form of a stiff wire screen j, of large mesh, is provided, which rests at its ends in recesses b', formed in the upper edges of the upper and rear sides of the pan b, so that it is held positively in such a position that each mesh thereof is disposed directly over one of the fingers i. That is, the arrangement is such that when the treadle g is depressed and the frame c is lifted, each finger will pass through the geometrical center of a corresponding mesh, and the parts are also so arranged that the upward movement of the fingers is limited at a point at which their faces i are held slightly above the level of the upper surface of the grating j.

The operation of the above-described device is as follows:—

The tank or pan will be filled to a suitable depth with a liquid cement, and the grating j will be placed in position, being held some distance above said level. The operator then lays the piece to be cemented flat upon the grating and depresses the treadle, lifting the frame c and causing the fingers to pass through the apertures of the grating into engagement with the under side of the piece thus supported, as indicated in the dotted line position of Fig. 3. Inasmuch as the fingers have previously been submerged, it will be apparent that a coating of cement will remain on the end faces of the fingers until they engage the work, so that they will apply dots, or small patches of cement to the surface thereof, as indicated in Fig. 5. When the treadle is released, the fingers will sink below the level of the cement, so that a fresh coating of cement will be applied thereto. The cemented piece will then be removed and applied to the part to which it is to be connected. It will be apparent that, in the up-and-down movement of the frame, the cement will flow freely between the bars h, so that the movement thereof will not be substantially impeded, and the cement will be permitted to flow away from the ends of the fingers on the up motion. While it is possible to operate the device without employing the grating j, by placing the work on the faces of the teeth, when in raised position, and then removing it before the teeth are permitted to descend, yet there are several important advantages to be derived from its use. Said grating prevents the operator from accidentally permitting the piece to be cemented from being dipped into the cement, which might occur in various ways, as by failing to remove the work from the fingers before the latter are permitted to sink back beneath the surface of the liquid. Furthermore, if the adhesive employed is very thick, it is liable to be supported in "strings" by the fingers in the spaces therebetween, close to the level of the faces at the ends of the fingers, so that the cement would be applied between said faces. By employing the grating j, this possibility is prevented, as the bars of the grating will press down the cement which thus tends to "string" across from one finger to another, and prevents it from coming in contact with the work. The grating also enables the machine to be more readily operated, as the work may be placed thereon without reference to the position of the fingers. It will be obviously immaterial whether the work is first placed on the grating and the fingers moved into engagement with the work, or whether the work is placed on the fingers after the latter have been lifted. The grating may be readily removed and the frame c disconnected from the rods f, to permit the pan to be conveniently emptied, when the apparatus is not in use.

I claim:—

1. A cementing machine comprising a tank for containing liquid cement, a horizontally disposed support having a series of rows of upwardly projecting fingers, said fingers having faces at their upper ends to provide a discontinuous cementing surface and supported to provide continuous slots between the fingers of each row, adapted to permit free flow of a heavy liquid through said support at each side of said fingers, and means to raise and lower said support to move said faces above and below the liquid level in the tank.

2. A cementing machine comprising a tank for containing liquid cement, a series of bars disposed therein in parallelism and spaced apart to provide passages therebetween, a row of upwardly projecting fingers on each bar having faces at their upper ends, providing a series of disconnected, adjacently-disposed cementing surfaces, supports for said bars extending transversely thereof at different points and permitting free flow of liquid up and down between said bars, and means to raise and lower said supports to move said faces above and below the liquid level in the tank.

3. A cementing machine comprising a tank for containing a liquid cement, a series of flat bars disposed therein in parallelism with their sides vertical and spaced apart to provide elongated narrow passages between said sides, each of said bars having a row of fingers projecting vertically from its upper edge, said bars and fingers being of approximately uniform thickness, and said fingers having faces at their upper ends, providing a series of disconnected, adjacently-disposed cementing faces, supports for said bars extending transversely thereof at different points and permitting free flow of liquid up and down between said bars, and means to raise and lower said supports to carry said faces above and below the liquid level in the tank.

4. In a cementing machine, a tank for containing liquid cement, a support having a series of horizontally-disposed flat bars arranged edgewise in approximate parallelism, and spaced apart to provide elongated passages therebetween, extending from their upper to their lower edges, and a series of vertically-extending fingers on the upper edge of each of said bars, said fingers having their ends arranged to form a discontinuous cementing surface, and means to raise and lower said support to carry the ends of said fingers above and below the liquid level in the tank.

5. A cementing machine comprising a liquid-containing tank, a holder disposed horizontally of said tank, and having a series of upwardly-extended, separately-spaced fingers provided with faces on their upper ends forming a correspondingly discontinuous, approximately horizontal surface, a screen disposed above said holder and having its apertures arranged to correspond to the spaces of said fingers, and means to raise said holder to pass said fingers through the screen apertures so that they protrude above the screen, and to lower it to carry said fingers below the liquid level of the tank, and means to permit the escape of the liquid between said fingers.

In testimony whereof, I have signed my name to this specification, in the presence of two subscribing witnesses.

HARRY G. McMURRAY.

Witnesses:
L. H. HARRIMAN,
H. B. DAVIS.